Dec. 28, 1926.
L. E. HILDEBRAND
1,612,120
SYSTEM FOR THE TRANSMISSION OF ANGULAR MOTION
Original Filed Dec. 15, 1921    2 Sheets-Sheet 1
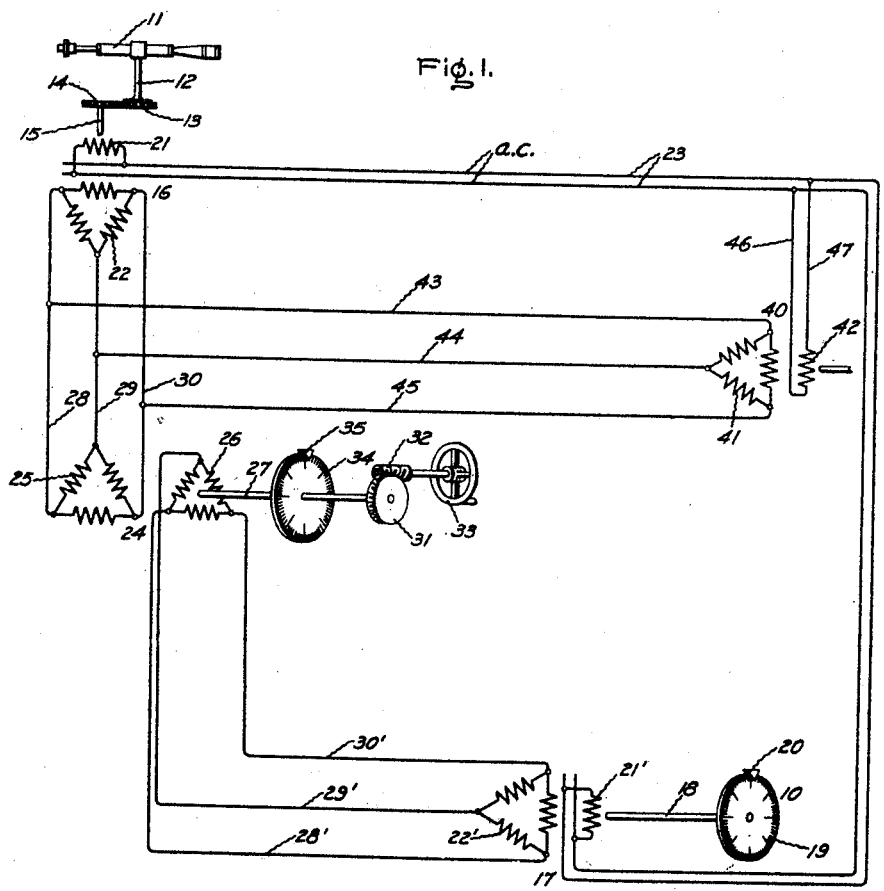
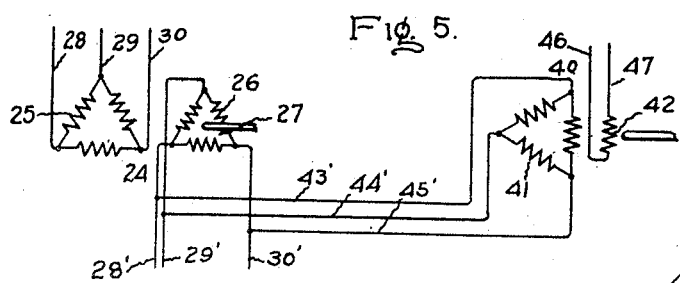
Inventor:
Lee E. Hildebrand,
by
His Attorney.

Dec. 28, 1926.

L. E. HILDEBRAND 1,612,120

SYSTEM FOR THE TRANSMISSION OF ANGULAR MOTION

Original Filed Dec. 15, 1921  2 Sheets-Sheet 2

Inventor:
Lee E. Hildebrand,
by Albert E. Davis
His Attorney.

Patented Dec. 28, 1926.

1,612,120

UNITED STATES PATENT OFFICE.

LEE E. HILDEBRAND, OF LYNN, MASSACHUSETTS, ASSIGNOR TO GENERAL ELECTRIC COMPANY, A CORPORATION OF NEW YORK.

SYSTEM FOR THE TRANSMISSION OF ANGULAR MOTION.

Application filed December 15, 1921, Serial No. 522,650. Renewed June 5, 1925.

My invention relates to systems for the transmission of angular motion and has for its object the provision of means for supplying the energy required for the excitation of inductive devices in such systems.

More specifically my invention relates to improvements in alternating current self synchronous or "selsyn" systems for the transmission of angular motion of the type described and claimed in a copending application of Edward M. Hewlett and Waldo W. Willard, Serial No. 501,007, filed Sept. 15, 1921, and assigned to the same assignee as this invention.

When a selsyn transformer is used for introducing changes in the angular relation between the transmitting and receiving devices, as disclosed in the aforesaid application, the exciting current for the transformer is supplied by the transmitting and receiving devices, which consequently must be made larger to carry this additional load. It is often desirable or imperative to use the smallest possible transmitting and receiving devices, in which case I have found it advantageous to provide auxiliary means for supplying the excitation energy for the transformer and also in certain cases for supplying the excitation energy for the transmitting device, or receiving device or for any other selsyn instrument connected to the system.

In carrying out my invention I have provided inductive means for supplying this exciting load which consists in one form of my invention of an auxiliary receiving device floating on the system. The voltage characteristics of the auxiliary receiving device are such that it supplies the exciting current for the transformer, thus relieving the transmitting and receiving devices of this load. The auxiliary receiving device may also be adapted to supply the excitation energy for the transmitting device or receiving device. In a modified form of my invention I have provided a separately excited field winding which is associated with the windings of the transformer so as to supply the exciting energy therefor.

Figure 2:
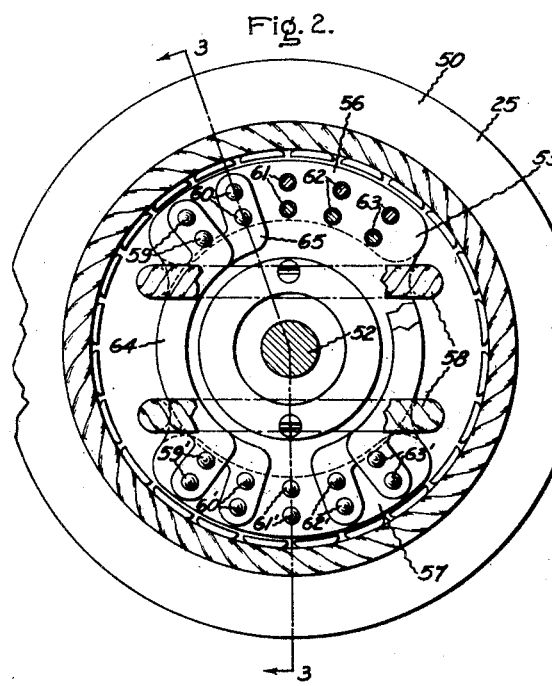
Figure 3:
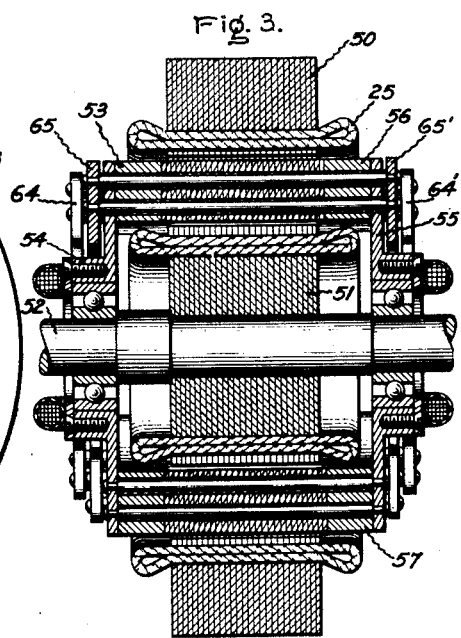
Figure 4:
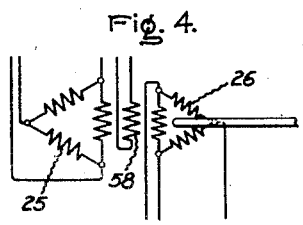

For a more complete understanding of my invention reference should be had to the accompanying drawings, in which Fig. 1 shows in diagrammatic form a system for the transmission of angular movement embodying my invention; Fig. 2 shows a modified form of my invention, Fig. 3 is a section view of Fig. 2 along the line 3—3 looking in the direction of the arrows, Fig. 4 is a diagrammatic representation of the modification shown in Figs. 2 and 3, while Fig. 5 shows in diagrammatic form a modification of my invention.

Referring to the drawing, in one form of my invention an indicator 10 is controlled in response to movement of a telescope 11 remote therefrom so as to indicate the angular position of the telescope. Movement of the telescope about the axis of its supporting shaft 12, which is maintained vertical, rotates a spur gear 13 attached thereto and meshing with a spur gear 14 secured to the rotor shaft 15 of a selsyn generator or transmitting device 16. The gears 13 and 14 may be arranged to transmit motion in a 1—1 ratio so that the rotor shaft will be driven at the same speed as the telescope. The transmitting device 16 is electrically connected to a similar device 17 which acts as a selsyn motor or receiving device to reproduce any angular movement imparted to the transmitting device 16 by the telescope. On the rotor shaft 18 of the receiving device 17 is secured the dial 19 of the indicator 10. The dial is graduated in a suitable manner, for example, in degrees and minutes of arc. A stationary pointer 20 cooperates with the dial and indicates thereon the position of the telescope 11.

The selsyn transmitting and receiving devices are similar in construction. They are provided with single phase field windings 21 and 21' on their rotors and with poly-circuit armature windings 22 and 22' on their stators. Windings 22 and 22' are physically identical with a poly-phase induction motor or alternating current generator armature winding. They are here shown as three phase delta connected windings. Obviously, if desired, the armature windings may be mounted on the rotor members and the field windings in the stator member. The single phase field windings are excited from a suitable source of alternating current supply 23, and hence set up fields which interlink with their co-operating armature windings. Like points of the armature windings are interconnected through an inductive device or selsyn transformer 24. The selsyn transformer comprises a polycircuit armature winding 25 on a stator member and similar polycircuit winding 26 inductively cooperating therewith and mounted on a rotor member having a shaft 27. Windings 25 and 26 are shown as three phase delta connected windings. Like points of winding 25 of the transformer and armature winding 22 of the transmitting device are interconnected by conductors 28, 29 and 30, while like points of winding 26 of the transformer and armature winding 22' of the receiving device are interconnected by conductors 28', 29' and 30'. Secured to shaft 27 is a worm gear 31 in engagement with which is a worm 32 operated by a hand wheel 33. The shaft 27 carries a dial 34, suitably calibrated, and cooperating with the dial is a stationary pointer 35.

The action of transmitting device 16, receiving device 17, and transformer 24 are as follows: Assuming that transformer windings 25 and 26 are in corresponding related position as shown in the drawing and that the rotors of the transmitting and receiving devices are in corresponding positions with relation to their stators, then the voltages which are induced in the various branches of the armature winding 22 by field winding 21 and inductively transmitted through transformer 24 are equal and opposite to the voltages induced in armature winding 22' by field winding 21'. Under these conditions there will be no voltage tending to cause a current to flow in the various armature windings. Upon movement of the telescope, a like movement is transmitted through gears 13 and 14 and shaft 15 to field winding 21, which then induces a new set of voltages in armature winding 22 causing an unbalanced voltage condition with resulting current flow. The rotor or receiving device 17 is acted upon by this current and, being free, is turned to a position in which it induces voltages in armature winding 22' exactly opposite to the voltages impressed upon it by armature winding 22. The receiving device 17 is thus caused to reproduce the motion of transmitting device 16.

The function of transformer 24 is to introduce changes in angular relation between the transmitting device and the receiving device. When the windings of the transformer are held in corresponding related positions, the transformer has no effect on the sets of voltages transmitted through it from transmitter 16. By turning winding 26 with relation to winding 25 by means of hand wheel 33, the transformer is caused to generate a different set of voltages whereby an angular displacement of receiving device 17 with relation to transmitting device 16 is introduced. The amount and direction of this displacement may be regulated as desired and are indicated on dial 34 by pointer 35.

The principal feature of my invention resides in providing means for supplying to the system the excitation energy for transformer 24, and also, if desired, for any other selsyn instrument connected to the system. The particular means which I have shown for accomplishing this result comprises an auxiliary receiving device 40 having a polycircuit armature winding 41 on its stator member and a single phase alternating field winding 42 on its rotor member. Obviously, if desired, the poly-circuit winding may be mounted on the rotor and the field winding on the stator. Armature winding 41 is connected to conductors 28, 29 and 30 by means of conductors 43, 44 and 45, while the field winding 42 is connected through conductors 46 and 47 to the alternating current supply source 23. The rotor of receiving device 40 is free and consequently assumes a position corresponding to the set of voltages impressed on winding 41 by the remainder of the system. Instead of being connected between the transmitting device and the transformer, the exciting device may be connected between the transformer and the receiving device as indicated in Fig. 5 by conductors 43', 44' and 45'.

When the exciting device 40 is connected between the transmitting device and the transformer, its voltage characteristics are preferably such that its no-load voltage is slightly greater than that of the transmitting device 16. When it is connected between the transformer and the receiving device, its voltage characteristics are preferably such that its no-load voltage is slightly higher than that of the receiving device. This excess in voltage is of such value that when the exciting device is supplying exciting current for the transformer, the drop in voltage caused by its own impedance is just sufficient to decrease its voltage to the no-load voltage of that part of the system to which it is connected. The exciting device thus supplies the exciting current for the transformer relieving the transmitting and receiving devices of this load.

In a modified form of my invention, shown in Figs. 2, 3 and 4, I have combined the exciting device with the transformer. A wide air gap is provided between the stator member 50 of the transformer on which polycircuit armature winding 25 is mounted and the rotor member 51 on which polycircuit armature winding 26 is mounted. Mounted on the rotor shaft 52 is a freely rotatable member 53 having parts of magnetic core iron moving in the air gap. This member comprises end supporting plates 54 and 55, mounted by means of suitable ball bearings on the rotor shaft on opposite ends of the rotor, which carry in diametrical relation are shaped core members 56 and 57. The core members move in the air gap between stator 50 and rotor 51 and close diametrical portions of the air gap. Mounted on rotor member 53 is an alternating current field winding 58 which corresponds to field winding 42 of the arrangement shown in Fig. 1 and is electrically connected to a suitable source of alternating current.

The rotor member 53 is also provided with a plurality of short circuited electrical conductors lying in planes at right angles with the plane of field winding 58. These short circuited conductors may be omitted if desired. They comprise pairs of insulated conducting bars 59 to 63, inclusive, extending through the core members 56 at right angles to the pole faces, and similar pairs of conducting bars 59' to 63', inclusive, extending through core member 57. Each pair of bars lies in a diameter of rotor 51. Corresponding ends of pairs 59 and 59' are electrically connected by curved end conducting members 64 and 64', while pairs 60 and 60' are similarly electrically connected by end members 65 and 65', so as to form closed loops or conductors. In like manner, pairs 62, 62' and 63, 63' are electrically connected by curved end conducting members (not fully shown). Pairs 61 and 61' are electrically connected to supported plates 54 and 55 so as to form therewith a closed loop. The short circuited conductors form no part of my present invention, being described and claimed in U. S. Patent No. 1,477,827 to Lee E. Hildebrand and David P. Thomson, dated December 18, 1923.

In the operation of this modification of my invention, the rotor member 53 takes up a position corresponding to the set of voltages impressed on transformer winding 25 by the transmitting device. This is due to the reaction between field winding 58 and winding 25, and also due in part to the reaction of winding 25 on the short circuited conductors. The inductive effect of field winding 58 on the transformer windings is just sufficient to give the transformer windings 25 and 26 no-load voltages equal to the no-load voltages of the transmitting and receiving devices, respectively. Coil 58 thus supplies the energy required to excite the transformer, relieving the transmitting and receiving devices of the load.

Where it is desirable to further reduce the size of the instruments, the auxiliary exciting means may, obviously, be adapted to supply the excitation energy for the transmitting device or for the receiving device as well as to the selsyn transformer, and it may be used for this purpose whether the system includes a selsyn transformer or not. In such cases the field winding may be omitted from the particular selsyn instrument which is to be excited by the auxiliary exciting means.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new, and desire to secure by Letters Patent of the United States, is:—

1. A system for the transmission of determined angular motion comprising a plurality of inductive devices including a motion transmitting device and a motion receiving device, said receiving device being arranged to reproduce any movement applied to said transmitting device, and an auxiliary receiving device having such voltage characteristics as to supply the exciting current for one of said inductive devices.

2. A system for the transmission of angular motion comprising a plurality of inductive devices including a transmitting device and a receiving device, said transmitting and receiving devices each comprising a polycircuit armature winding and a field winding supplied with alternating current, and an auxiliary receiving device having such voltage characteristics as to supply the exciting current for one of said inductive devices.

3. A system for the transmission of angular motion comprising an electrically inductive transmitting device, an electrically inductive receiving device responsive to movement of the transmitting device, an inductive device interposed between said transmitting and receiving devices for controlling the angular relation thereof, and auxiliary means for supplying the excitation energy for one of said devices.

4. A system for the transmission of angular motion comprising an electrical transmitting device, an electrical receiving device responsive to movement of the transmitting device, inductively cooperating relatively movable windings for changing the angular relation of said devices, and means responsive to movement of said transmitting device for exciting said cooperating windings.

5. A system for the transmission of angular motion comprising a transmitting device having relatively movable armature and field windings, a receiving device having similar windings and responsive to movement of the transmitting device, inductive means connected between said armature windings for changing the angular relation of said devices, and an auxiliary field winding for exciting said inductive means.

6. A system for the transmission of angular motion comprising a transmitting device having relatively movable armature and field windings, a receiving device having similar windings and responsive to movement of the transmitting device, inductively cooperating relatively movable armature windings connected between said devices for changing the angular relation thereof, and an auxiliary field winding for exciting said cooperating armature windings.

7. A system for the transmission of angular motion comprising a transmitting device having relatively movable polycircuit armature and single phase field windings, a receiving device having similar windings and responsive to movement of said transmitting device, a source of alternating current for said field windings, a transformer having relatively movable polycircuit windings connected between said devices for changing the angular relation thereof, and an auxiliary field winding connected to said source of alternating current for supplying the excitation energy for said transformer.

8. A system for the transmission of angular motion comprising an electrical transmitting device, an electrical receiving device responsive to movement of said transmitting device, an electric circuit connecting said devices, inductive means interposed in said circuit for controlling the angular relation of said devices, and means connected to said circuit for supplying the exciting current for said inductive means.

9. A system for the transmission of angular motion comprising an electrical transmitting device, an electrical receiving device responsive to movement of said transmitting device, an electric circuit connecting said devices, inductive means interposed in said circuit for controlling the angular relation of said devices, and an auxiliary receiving device connected to said circuit for supplying the exciting current for said inductive means.

10. A system for the transmission of angular motion comprising a transmitting device having relatively movable armature and field windings, a receiving device having similar windings and responsive to movement of the transmitting device, inductively cooperating relatively movable armature windings for changing the angular relation of said devices, and an auxiliary receiving device responsive to said transmitting device for supplying the exciting current for said cooperating armature windings.

11. A system for the transmission of angular motion comprising a transmitting device having relatively movable polycircuit armature and single phase field windings, a receiving device having similar windings and responsive to movement of said transmitting device, a source of alternating current for said field windings, a polycircuit transformer connected between said armature windings, means for changing the relation of the windings of said transformer to control the movement of said receiving device, and an auxiliary receiving device connected to supply the exciting current for said transformer.

12. A system for the transmission of angular motion comprising a transmitting device including relatively movable polycircuit armature and single phase field windings, a receiving device having similar windings and responsive to movement of the transmitting device, a source of alternating current for said field windings, inductively cooperating polycircuit windings connected between said armature windings, one of said polycircuit windings being rotatably mounted whereby its relation with the other polycircuit winding can be adjusted to control the movement of the receiving device, and an auxiliary receiving device connected to supply the exciting current for said cooperating polycircuit windings.

In witness whereof, I have hereunto set my hand this 13th day of Dec., 1921.

LEE E. HILDEBRAND.